(12) United States Patent
Fukuda et al.

(10) Patent No.: US 10,319,491 B2
(45) Date of Patent: Jun. 11, 2019

(54) RECTANGULAR WIRE, AND METHOD OF PRODUCING THE SAME AND ELECTRICAL EQUIPMENT USING THE SAME

(71) Applicants: FURUKAWA ELECTRIC CO., LTD., Tokyo (JP); FURUKAWA MAGNET WIRE CO., LTD., Tokyo (JP)

(72) Inventors: Hideo Fukuda, Tokyo (JP); Dai Fujiwara, Tokyo (JP); Tsuneo Aoi, Tokyo (JP); Hiroshi Kaneiwa, Aichi (JP); Yuki Amano, Aichi (JP)

(73) Assignees: Furukawa Electric Co., Ltd., Tokyo (JP); Furukawa Magnet Wire Co., Ltd., Tokyo (JP)

( * ) Notice: Subject to any disclaimer, the term of this patent is extended or adjusted under 35 U.S.C. 154(b) by 0 days.

(21) Appl. No.: 15/061,134

(22) Filed: Mar. 4, 2016

(65) Prior Publication Data
US 2016/0189824 A1 Jun. 30, 2016

Related U.S. Application Data

(63) Continuation of application No. PCT/JP2014/072312, filed on Aug. 26, 2014.

(30) Foreign Application Priority Data

Sep. 6, 2013 (JP) ................................. 2013-185412

(51) Int. Cl.
*H01B 3/30* (2006.01)
*H01F 5/06* (2006.01)
(Continued)

(52) U.S. Cl.
CPC ............. *H01B 3/308* (2013.01); *H01B 3/302* (2013.01); *H01B 3/303* (2013.01); *H01B 3/307* (2013.01);
(Continued)

(58) Field of Classification Search
CPC .. H01F 5/06; H01F 27/323; H01F 2027/2838; H01B 7/02; H01B 7/0823
(Continued)

(56) References Cited

U.S. PATENT DOCUMENTS 3,252,117 A * 5/1966 Fischer ............... H01F 27/2871
174/34
3,723,797 A * 3/1973 Andersson ............... H01B 3/04
174/117 FF
(Continued)

FOREIGN PATENT DOCUMENTS

CA 1161616 * 2/1984
CN 101073127 A 11/2007
(Continued)

OTHER PUBLICATIONS

Original Japanese version and English Machine Translation of Takahashi (JP2005-203334) provided with Office Action.*
(Continued)

*Primary Examiner* — Roshn K Varghese
(74) *Attorney, Agent, or Firm* — Birch, Stewart, Kolasch & Birch, LLP

(57) ABSTRACT

A rectangular wire having: a multilayer conductor member constructed by stacking, in a thickness direction, a rectangular metallic conductor that has a layer of a thermosetting resin formed on the outer periphery thereof, the thermosetting resin having a glass transition temperature of 100° C. or more and 200° C. or less and having a urethane bond; and a layer of a thermoplastic resin having a melting point of 300° C. or more on the outer periphery of the multilayer conductor member.

6 Claims, 4 Drawing Sheets

(51) Int. Cl.
*H02K 3/30* (2006.01)
*H02K 15/04* (2006.01)
*H01B 13/06* (2006.01)
*H01B 7/00* (2006.01)
*H01F 27/28* (2006.01)

(52) U.S. Cl.
CPC ........... *H01B 7/0009* (2013.01); *H01B 13/06* (2013.01); *H01B 13/065* (2013.01); *H01F 5/06* (2013.01); *H01F 27/2823* (2013.01); *H02K 3/30* (2013.01); *H02K 15/04* (2013.01)

(58) Field of Classification Search
USPC .......................................... 174/117 R, 119 R
See application file for complete search history.

(56) References Cited

U.S. PATENT DOCUMENTS

| | | | | |
|---|---|---|---|---|
| 4,216,263 A | * | 8/1980 | Otis | H01B 3/305 174/110 N |
| 4,321,426 A | * | 3/1982 | Schaeffer | H01F 27/323 174/34 |
| 4,552,990 A | * | 11/1985 | Persson | H01F 27/2823 174/117 FF |
| 6,710,692 B2 | * | 3/2004 | Kato | H01F 17/04 336/200 |
| 2008/0128154 A1 | | 6/2008 | Faust et al. | |
| 2008/0231136 A1 | * | 9/2008 | Obata | H02K 3/345 310/179 |
| 2012/0279754 A1 | * | 11/2012 | Rabbia | H02K 3/14 174/117 R |
| 2013/0037304 A1 | | 2/2013 | Ikeda et al. | |

FOREIGN PATENT DOCUMENTS

| | | | |
|---|---|---|---|
| EP | 2328154 A1 | 6/2011 | |
| EP | 2843668 A1 | 3/2015 | |
| JP | 59-29307 A | 2/1984 | |
| JP | 02078108 A | * 3/1990 | |
| JP | 7-130219 A | 5/1995 | |
| JP | 2005203334 A | * 7/2005 | |
| JP | 2007-18732 A | 1/2007 | |
| JP | 2008-186724 A | 8/2008 | |
| JP | 2009-245666 A | 8/2008 | |
| JP | 2013-41700 A | 2/2013 | |
| WO | WO 9814964 A1 | * 4/1998 | ......... H01F 27/2823 |

OTHER PUBLICATIONS

Original German version and English Machine Translation of Perger (WO 98/14964) provided with Office Action.*
Original English copy of Janssen (CA 1161616) provided with Office Action.*
International Search Report, issued in PCT/JP2014/072312, dated Dec. 2, 2014.
Extended European Search Report, dated Mar. 23, 2017, for corresponding European Application No. 14842115.9.
Chinese Office Action and Search Report dated Nov. 3, 2017 for corresponding Application No. 201480048420.5, along with an English translation thereof.

* cited by examiner

RECTANGULAR WIRE, AND METHOD OF PRODUCING THE SAME AND ELECTRICAL EQUIPMENT USING THE SAME

CROSS-REFERENCE TO RELATED APPLICATIONS

This application is a Continuation of PCT International Application No. PCT/JP2014/072312 filed on Aug. 26, 2014, which claims priority under 35 U.S.C. § 119 (a) to Japanese Patent Application No. 2013-185412 filed in Japan on Sep. 6, 2013. Each of the above applications is hereby expressly incorporated by reference, in its entirety, into the present application.

TECHNICAL FIELD

The present invention relates to a rectangular wire, which is composed by stacking a plurality of rectangular metallic bodies, and which is mainly intended for a high-frequency application, and further the present invention relates to a method of producing the same and electrical equipment using the same.

BACKGROUND ART

In general, the high-frequency rectangular wire is used for coils and the like of the AC motor and the high-frequency electrical equipment. This is also applied to motors for a high-speed railroad vehicle, in addition to motors for a hybrid vehicle (HV) and an electric vehicle (EV). Conventional rectangular wires are composed by stacking rectangular metallic bodies each having a rectangular shape of a cross-section and an insulative enamel film or oxide film formed on the outer periphery of the rectangular metallic body (for example, see Patent Literature 1 or 2).

CITATION LIST

Patent Literatures

Patent Literature 1: JP-A-S59 (1984)-029307 ("JP-A" means unexamined published Japanese patent application)
Patent Literature 2: JP-A-2009-245666

SUMMARY OF INVENTION

Technical Problem

In the conventional high-frequency rectangular wires, which are composed by stacking a plurality of rectangular metallic bodies having an insulative enamel film formed on the outer periphery thereof, high-frequency property is developed by stacking the rectangular metallic conductors. However, the enamel film remains as soot at the welding step in assembling of a motor. As a result, the soot made it difficult to rigidly weld.

The present invention has been made to solve the above problem and is to provide a rectangular wire which allows a rigid weld of the rectangular wire at the welding step in assembling of the motor, while satisfying high-frequency property, and to provide a method of producing the same and an electrical equipment using the same.

Solution to Problem

The rectangular wire of the present invention has a multilayer conductor member and a layer of a thermoplastic resin having a melting point of 300° C. or more on the outer periphery thereof, the multilayer conductor member being constructed by forming a layer of a thermosetting resin having a glass transition temperature of 100° C. or more and 200° C. or less and having a urethane bond formed on the outer periphery of a rectangular metallic body as a layer to be stacked, and by stacking the resin-coated rectangular metallic body in the form of multi-layers.

That is, the present invention provides the following means:

(1) A rectangular wire having:
a multilayer conductor member constructed by stacking, in a thickness direction, a rectangular metallic conductor that has a layer of a thermosetting resin formed on the outer periphery thereof, the thermosetting resin having a glass transition temperature of 100° C. or more and 200° C. or less and having a urethane bond; and
a layer of a thermoplastic resin having a melting point of 300° C. or more on the outer periphery of the multilayer conductor member.

(2) A rectangular wire having:
a multilayer conductor member constructed by stacking a rectangular basic wire obtained by forming a layer of a thermosetting resin only on one side of a rectangular metallic conductor, on the side of the formed layer of the thermosetting resin, the thermosetting resin having a glass transition temperature of 100° C. or more and 200° C. or less and having a urethane bond; and
a layer of a thermoplastic resin having a melting point of 300° C. or more on the outer periphery of the multilayer conductor member.

(3) The rectangular wire described in the item (1) or (2), wherein the thermosetting resin is a polyurethane.

(4) The rectangular wire described in any one of the items (1) to (3), wherein the thermoplastic resin is a resin selected from the group consisting of a polyaryletherketone, a modified polyetheretherketone, and a thermoplastic polyimide.

(5) The rectangular wire described in any one of the items (1) to (4), wherein the total number of stacking the rectangular metallic conductors in the thickness direction is 2 or more and 6 or less.

(6) The rectangular wire described in any one of the items (1) to (5), wherein a thickness of a baked coat layer formed by bake-coating the thermosetting resin is 0.5 µm or more and 50 µm or less.

(7) A method of producing a rectangular wire comprising:
a step of forming a multilayer conductor member by stacking, in a thickness direction, a rectangular metallic conductor having formed by bake-coating a layer of a thermosetting resin on the outer periphery thereof, the thermosetting resin having a glass transition temperature of 100° C. or more and 200° C. or less and having a urethane bond; and
a step of coating a layer of a thermoplastic resin having a melting point of 300° C. or more on the outer periphery of the multilayer conductor member.

(8) An electrical equipment comprising a rectangular wire having:
a multilayer conductor member constructed by stacking, in a thickness direction, a rectangular metallic conductor having a layer of a thermosetting resin formed on the outer periphery thereof, the thermosetting resin having a glass transition temperature of 100° C. or more and 200° C. or less and having a urethane bond; and
a layer of a thermoplastic resin having a melting point of 300° C. or more on the outer periphery of the multilayer conductor member.

Advantageous Effects of Invention

According to the rectangular wire of the present invention, an inhibitory effect on the high-frequency loss can be achieved, by selecting the thermosetting resin having a glass transition temperature of 100° C. or more and 200° C. or less and having a urethane bond. Together with this advantage, ease of welding can be combined, without generating soot upon welding.

The method of producing a rectangular wire according to the present invention allows provision of a method of producing a rectangular wire which exhibits an excellent high-frequency property and ease of welding.

The electrical equipment of the present invention allows provision of an electrical equipment which exhibits an excellent high-frequency property together with a high reliance of wire jointing because the rectangular wire of the present invention has an excellent welding property.

Other and further features and advantages of the invention will appear more fully from the following description, appropriately referring to the accompanying drawings.

BRIEF DESCRIPTION OF DRAWINGS

FIG. 2(a) is a cross-section view showing a cross-section of the metallic conductor on which a layer of a thermosetting resin has been formed by coating, and FIG. 2(b) is a cross-section view showing a cross-section of the rectangular wire in which a layer of a thermoplastic resin has been formed on the multilayer conductor member.

FIG. 3(a) is a perspective view showing an example which exhibits excellent welding property, FIG. 3(b) is a perspective view showing an example in which the welding is possible, FIG. 3(c) is a perspective view showing an example which provides a poor welding property, and FIG. 3(d) is a perspective view showing an example in which the welding became impossible.

FIG. 4(a) is a cross-section view showing an example which exhibits excellent molding property, FIG. 4(b) is a cross-section view showing an example which exhibits a good molding property, FIG. 4(c) is a cross-section view showing an example in which the molding property is in an acceptable range, and FIG. 4(d) is a cross-section view showing an example which provides a poor molding property.

Note, however, that indication of the hatching showing the cross-section was omitted.

MODE FOR CARRYING OUT THE INVENTION

With regard to the rectangular wire of the present invention, one of preferable embodiments is described with reference to FIG. 1.

Figure 1:
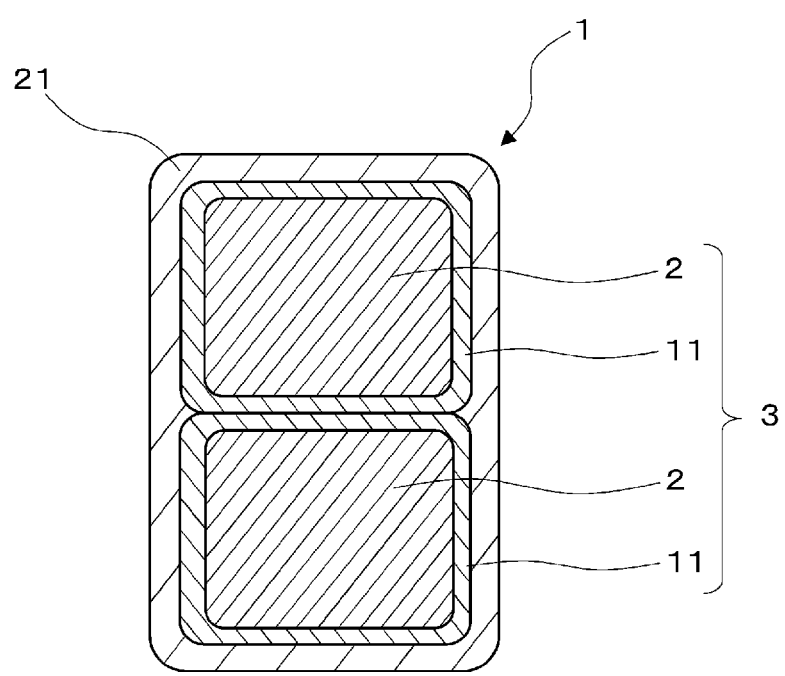
FIG. 1 is a cross-section view showing one of preferable embodiments related to the rectangular wire of the present invention.

As shown in FIG. 1, the rectangular wire 1 has a multilayer conductor member 3 constructed by stacking, in the thickness direction, a rectangular metallic conductor (also referred to as a metallic conductor) 2 having a rectangular cross-section and having a layer 11 of a thermosetting resin formed on the outer periphery thereof. Further, the rectangular wire 1 has a layer 21 of a thermoplastic resin having a melting point of 300° C. or more on the outer periphery of the multilayer conductor member 3. The layer 11 of the thermosetting resin is composed of a thermosetting resin having a glass transition temperature of 100° C. or more and 200° C. or less and having a urethane bond. The rectangular wire 1 having such a construction allows a combination of an inhibitory effect on the high-frequency loss and ease of welding, without generating soot upon welding.

(Conductor)

As for the rectangular metallic conductor 2 in the rectangular wire 1, those that have been used as a conventional rectangular wire may be used. Examples of the rectangular metallic conductor 2 include a conductor of, preferably, a low-oxygen copper having an oxygen content of 30 ppm or less, or an oxygen-free copper. If the oxygen content of the rectangular metallic conductor 2 is 30 ppm or less, when the rectangular metallic conductor 2 is fused by heat for welding, generation of voids due to oxygen contained in the welded place is suppressed. Further, together with prevention of the electric resistance in the welded place from deterioration, mechanical strength at the welded place can be maintained.

(Layer on the Outer Periphery of Metallic Conductor)

The layer to be formed on the outer periphery of the metallic conductor 2 in the rectangular wire 1 is formed by the layer 11 of a thermosetting resin having a glass transition temperature of 100° C. or more and 200° C. or less and having a urethane bond. Examples of the thermosetting resin include a polyurethane varnish and a heat-resistant soldable varnish, manufactured by Totoku Toryo Co., Ltd. The above thermosetting resin causes such problems that if a glass-transition temperature is too low, an anti-heat aging property becomes low, whereas if the glass-transition temperature is too high, a welding property becomes low and also a flexibility of the wire becomes poor.

As the layer 11 of the thermosetting resin to be formed on the outer periphery of the metallic conductor 2, the thickness thereof may be 60 μm or less, in order to decrease the number of passing the layer 11 through a baking furnace, thereby for preventing a bake-coated layer from deterioration as much as possible, and developing the high-frequency property. Further, in consideration of obtaining molding property of the multilayer conductor member 3, the thickness of the layer 11 of the thermosetting resin is preferably 50 μm or less, more preferably 25 μm or less, and still more preferably 15 μm or less. On the other hand, in order to develop the high-frequency property and also to obtain insulation property between metallic conductors, there is no particular limitation, as long as the thickness thereof may be within a degree of not causing pinholes. Specifically, the thickness of the layer 11 of the thermosetting resin is preferably 0.5 μm or more, more preferably 2 μm or more, and still more preferably 3 μm or more.

The baked layer of the thermosetting resin can be formed by bake-coating, preferably in a plurality of times, a resin varnish containing the thermosetting resin on the metallic conductor 2. The method of coating the resin varnish may be in a usual manner. Examples of the coating method include a method of employing a die for a varnish coating, which has been manufactured so as to be similar to the shape of the metallic conductor 2, and a method of employing a die that is called "universal die", which is formed in a curb shape when the cross-section shape of the metallic conductor 2 is quadrangular. The metallic conductor 2 having the varnish of these resins coated thereon is baked by a baking furnace in a usual manner. Specific baking conditions depend on the shape of a furnace to be used. For example, if the furnace is an about 5 m-sized vertical furnace by natural convection, the baking can be achieved by setting the passing time period to 10 to 90 sec at the temperature of 400 to 500° C.

Figure 2A:
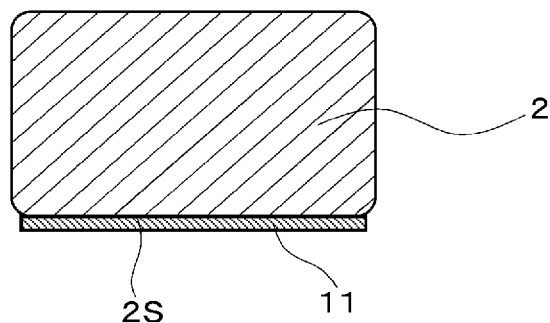
FIGS. 2(a) and 2(b) each illustrate a cross-section view showing another of preferable embodiments related to the rectangular wire of the present invention. In the figures.
Figure 2B:
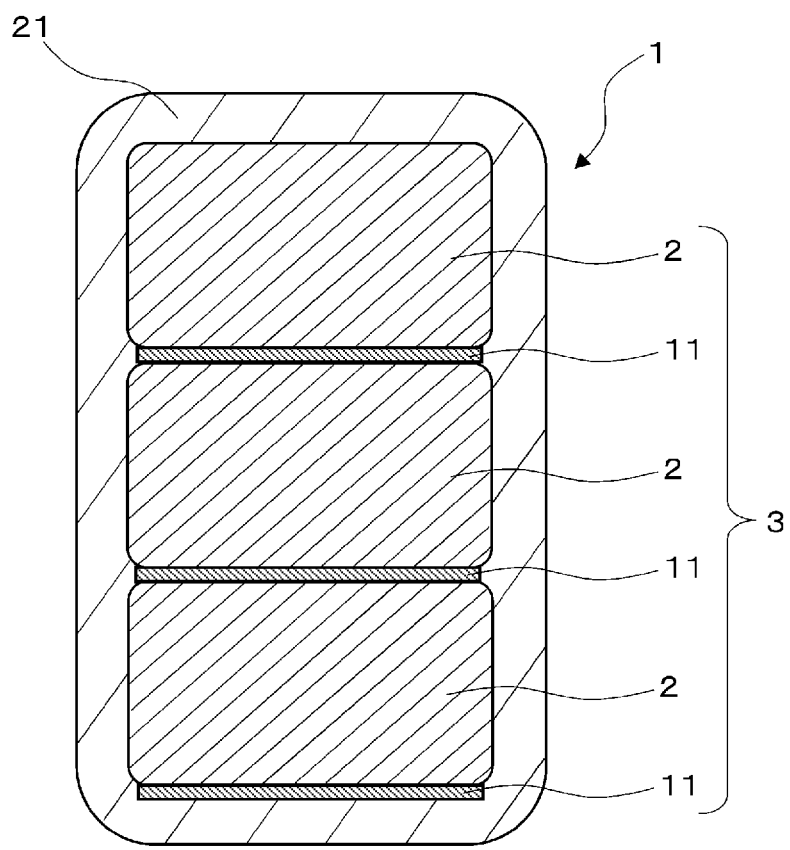

Further, in the step of coating and baking the resin varnish containing the thermosetting resin on the metallic conductor 2, the layer 11 of the thermosetting resin may be formed by bake-coating of the resin varnish only on one side 2S of four sides existing on the outer periphery of the metallic conductor 2, as shown in FIG. 2(*a*). In this case, a desired constitution can be obtained by masking the sides other than the side necessary for coating and by coating the varnish only on the one necessary side 2S. Further, as shown in FIG. 2(*b*), the multilayer conductor member 3 is formed by stacking rectangular basic wires each of which is composed of the metallic conductor 2 having the layer 11 of the thermosetting resin formed thereon, in the form of multilayer, through the layer 11 of the thermosetting resin. In the drawing, as an example, the multilayer conductor member 3 in which 3 layers are stacked is shown. Further, in the same manner as described above, the layer 21 of the thermoplastic resin is formed on the outer periphery of the multilayer conductor member 3, whereby the rectangular wire 1 is constituted.

It is noted that the number of layers to stack the metallic conductor 2 is preferably 2 or more and 6 or less. A decrease in the high-frequency loss can be fully appreciated even in the case where the number of layers to stack is 2. As the number of the layers increases, the loss is more decreased. In the case where the number of layers to stack is 7 or more, a decrease in the high-frequency loss can be also appreciated. However, because the proportion of an insulation member increases and the filling rate of the metallic conductor decreases, it is thought that a sufficient decrease of the loss cannot be appreciated. Further, it is difficult to stack 7 or more layers without misalignment. In view of the above, it can be said to be realistic that the number of layers to stack is up to 6.

Further, with regard to the direction to stack, whether the layers are stacked in any one of the direction of width or thickness does not make any difference, provided that the longer side of the rectangular metallic conductor 2 is defined as a width, and the shorter side thereof is defined as a thickness. Preferably, the rectangular metallic conductors 2 are brought into contact with one another through their longer sides and are stacked in the thickness direction.

(Layer on Outer Periphery of Multilayer Conductor Member)

As the layer on the outer periphery of the multilayer conductor member 3 in the rectangular wire 1, at least one layer exhibiting high strength of adhesion to the multilayer conductor member 3 is provided on the outer periphery of the multilayer conductor member 3. The layer number may be one or may be more than one.

The layer on the outer periphery of the multilayer conductor member 3 is the layer 21 of the thermoplastic resin and the thermoplastic resin is an extrusion-moldable thermoplastic resin. The melting point of this thermoplastic resin is preferably 300° C. or more, and more preferably 330° C. or more, in terms of excellent adhesion strength between the multilayer conductor member and the layer on the outer periphery of the multilayer conductor member and excellent solvent resistance, in addition to anti-heat aging property. The upper limit of the melting point of the thermoplastic resin is preferably 450° C. or less. The melting point of the thermoplastic resin can be measured by differential scanning calorimetry (DSC).

This thermoplastic resin preferably has relative permittivity of 4.5 or less, and more preferably 4.0 or less, in that a partial discharge inception voltage can be more increased. The relative permittivity can be measured by a commercially available permittivity measurement device. The measuring temperature and frequency are changed as needed. In the present specification, the values measured at 25° C. and 50 Hz are adopted, unless otherwise specified.

The layer 21 of the thermoplastic resin exhibits high strength of adhesion to the multilayer conductor member 3, and at least one or more than one layer is provided on the outer periphery of the multilayer conductor member 3.

Examples of the extrusion-moldable thermoplastic resin include polyetheretherketone (PEEK), a modified polyetheretherketone (modified-PEEK), a thermoplastic polyimide (TPI), a polyamide having an aromatic ring (referred to as an aromatic polyamide), polyketone (PK) and the like.

As the thermoplastic resin, use may be made of a polyaryletherketone (PAEK), which is a thermoplastic resin containing an aromatic ring, an ether bond and a ketone bond and which is represented by polyetherketone (PEK) and polyetheretherketone. Alternatively, use may be made of a modified polyetheretherketone in which other thermoplastic resin(s) is (are) mixed in polyetheretherketone. Alternatively, use may be made of at least one thermoplastic resin selected from the group consisting of thermoplastic polyimides. Among those thermoplastic resins, use may be made of those having a melting point of 300° C. or more and 450° C. or less and preferably having relative permittivity of 4.5 or less. As the thermoplastic resin, one kind may be used alone, or more than one kind may be used. In the case where at least two kinds are mixed and at least two kinds of melting points exist, if the at least two kinds of melting points include a melting point of 300° C. or more, the mixture may be suitable. Further, the modified polyetheretherketone is, for example, a mixture in which polyphenylsulfone is added to polyetheretherketone, the mixing rate of polyphenylsulfone being lower than polyetheretherketone.

It is preferred in achieving advantageous effects of the present invention that the thickness of the layer 21 of the thermoplastic resin which is an extrusion-coated resin layer is 40 μm or more and 200 μm or less. If the thickness of the layer 21 of the thermoplastic resin which forms a layer on the outer periphery of the multilayer conductor member 3 is too thick, the layer 21 of the thermoplastic resin becomes less effective in flexibility required for the rectangular wire 1, because the layer 21 of the thermoplastic resin itself has stiffness. On the other hand, from the viewpoint that insulation failure can be prevented, the thickness of the layer 21 of the thermoplastic resin is preferably 40 μm or more and more preferably 50 μm or more.

The extrusion temperature conditions in extrusion molding of the thermoplastic resin are set adequately depending on the thermoplastic resin to be used. Stated as an example of a preferable extrusion temperature, specifically, in order to make the fusing temperature appropriate for extrusion-coating, the extrusion temperature is set to a temperature higher than the melting point of the thermoplastic resin by about 40° C. to 60° C. In this way, the layer 21 of the thermoplastic resin which is an extrusion-coated resin layer is formed by temperature-setting extrusion molding. In this case, in forming the covering resin layer in the production process, it is not necessary to pass the covering resin layer into a baking furnace, so that there is an advantage that the thickness of the insulation layer, namely the layer 21 of the thermoplastic resin can be thickened, without growing the thickness of the oxidized coat layer of the metallic conductor 2.

In the rectangular wire 1 according to this preferable embodiment, the multilayer conductor member 3 and the layer 21 of the thermoplastic resin on the outer periphery thereof adhere to one another at a high strength of adhesion. The adhesion strength between the multilayer conductor member 3 and the layer 21 of the thermoplastic resin on the outer periphery thereof is measured, for example, in the same manner as "5.2 Stretch test" of "JIS C 3216-3 Winding wires-Test methods-Part 3 Mechanical properties", and whether a float in the specimen after stretching is present or absent can be examined with the naked eye.

Further, the rectangular wire 1 according to this preferable embodiment exhibits excellent anti-heat aging property. The anti-heat aging property serves as an indicator for retention of reliance that insulation performance is not decreased over a long period of time even in the use under high temperature circumstances. For example, a wound specimen is used, in accordance with "5-1 Winding test" of "JIS C 3216-3 Winding wires-Test methods-Part 3 Mechanical properties". After still standing of it in a high-temperature tank heated at 190° C. for 1,000 hours, whether the crack generated in the layer 21 of the thermoplastic resin (the layer on the outer periphery of the multilayer conductor member 3) is present or absent can be examined with the naked eye. The rectangular wire 1 according to this preferable embodiment allows maintenance of the anti-heat aging property over a much longer period of time, for example, even after still standing for 1,500 hours, even in the use under high temperature circumstances.

In this embodiment, when the crack of the layer 21 of the thermoplastic resin is indeterminable and there is no abnormality, the anti-heat aging property can be evaluated as being excellent. In the rectangular wire 1 according to this preferable embodiment, the crack cannot be seen in the layer 21 of the thermoplastic resin after 1,000 hours as a matter of course, even after 1,500 hours. As a result, the rectangular wire 1 exhibits an excellent anti-heat aging property and reliance can be held over a much longer period of time even in the use under high temperature circumstances.

With regard to resistance to solvent, a wound specimen is used, in accordance with "5-1 Winding test" of "JIS C 3216-3 Winding wires-Test methods-Part 3 Mechanical properties". The test can be carried out by checking with the naked eye the surface of the layer 21 of the thermoplastic resin, after immersion of the wound specimen in a solvent for 10 seconds. In this embodiment, the test is carried out by using 3 kinds of solvents of acetone, xylene and styrene and 2 levels of temperature of normal temperature and 150° C. (just after heating the solvent at 150° C. for 30 minutes, the specimen, while it is hot, is immersed in the solvent). Then, when there is no abnormality in the surface of the layer 21 of the thermoplastic resin, the resistance to solvent is evaluated as being very excellent. In the rectangular wire 1 according to this preferable embodiment, no abnormality is found in the surface of the layer 21 of the thermoplastic resin, whatever the solvent is any of acetone, xylene and styrene, and the temperature is either of normal temperature or 150° C.

The rectangular wire 1 of the present invention may have a configuration in which the multilayer conductor members 3 are aligned in parallel to one another in multi-lines and are covered with the layer 21 of the thermoplastic resin. Even by such a multi-line configuration, the same performance as the single-line configuration can be obtained.

The rectangular wire 1 of the present invention as described above is preferably applied to a coil which constitutes motors of a hybrid vehicle or an electric vehicle, as an example of the electrical equipment. For example, the rectangular wire 1 can be used for a winding wire which forms a stator coil of the rotating electrical machine (motor) as described in JP-A-2007-259555. The constitution in which such a rectangular wire as the present invention is stacked has an advantage that a current loss is minor even in the high-frequency region. In this point, an advantage is given in association with a higher power of the motor of the electric vehicle and the hybrid vehicle.

EXAMPLES

The present invention will be described in more detail based on examples given below, but the invention is not meant to be limited by these.

Example 1

A rectangular metallic conductor 2 (see FIG. 1) was provided, which was made of copper of 0.85×3.2 mm (thickness×width) having chamfered four-cornered radius r=0.3 mm, and which had oxygen content of 15 ppm. In formation of a layer 11 (see FIG. 1) of a thermoplastic resin to become an outer peripheral layer of the metallic conductor 2 made of copper, a polyurethane varnish was coated on the metallic conductor 2, using a die having a shape similar to the metallic conductor 2. As the polyurethane varnish, use was made of trade name: TPU5243, manufactured by Totoku Toryo Co., Ltd., glass-transition point (Tg) of 115° C. Then, the thus-coated metallic conductor 2 was got through an 8 m-length baking furnace set to 450° C. at the baking speed so that the baking time became 15 seconds. At this one baking step, a polyurethane enamel wire (UEW) layer with thickness 0.5 μm was formed. By adjusting a varnish concentration, the polyurethane enamel wire (UEW) layer with thickness 0.5 μm was formed, to obtain the metallic conductor 2 with the 0.5 μm-thick coating layer.

The thus-obtained metallic conductors 2 were stacked so as to be two layers in the thickness direction, thereby for obtaining a multilayer conductor member 3 (see FIG. 1), and then a layer 21 of a thermoplastic resin (see FIG. 1) was provided on the outer periphery thereof by extrusion molding. As a screw of the extruder, use was made of the screw specified by: 30 mm full flight; L/D=20; and compression ratio 3. The extrusion was carried out using a polyetheretherketome (PEEK) as the thermoplastic resin, in accordance with the temperature conditions for extrusion, as shown in Table 1. As the PEEK, use was made of trade name: KITA SPIRE KT-820, manufactured by Solvay Specialty Polymers, relative permittivity 3.1, melting point 343° C. "C1, C2, and C3" in Table 1 indicate a cylinder temperature in the extruder, and respectively indicate 3-zone temperatures in the order from the resin-casting section. "H" indicates a temperature of the head section, and "D" indicates a temperature of the die section. After extrusion-coating for the multilayer conductor member 3 with the polyetheretherketone using an extruding die, the multilayer conductor member 3 was allowed to still stand for 10 seconds and then was cooled with water. Then, the layer 21 of the thermoplastic resin (see FIG. 1) was formed on the outer periphery of the multilayer conductor member 3 so as to be a thickness of 105 μm, thereby for obtaining the rectangular wire 1 (see FIG. 1).

Examples 2, 4, 5, 6

The thickness of each of the layer 11 of the thermosetting resin (see FIG. 1) and the layer 21 of the thermoplastic resin (see FIG. 1) was changed to thicknesses shown in Table 2. The rectangular wire 1 (see FIG. 1) was obtained in the same manner as Example 1, except that the thickness was changed.

Examples 3, 12

A rectangular metallic conductor, which was made of copper of 0.141×3.2 mm (thickness×width) having chamfered four-cornered radius r=0.3 mm, and which had oxygen content of 15 ppm, is provided. Then, the rectangular wire 1 (see FIG. 1) was obtained in the same manner as Example 1, except that the thickness of each of the layer of the thermosetting resin and the layer of the thermoplastic resin was changed to thicknesses shown in Table 2 and that the number of stacked layers was changed to 6.

Example 7

In the layer 21 (see FIG. 1) of the thermoplastic resin, a modified polyetheretherketone was used in place of the polyetheretherketone. As the modified polyetheretherketone, use was made of a modified-PEEK, manufactured by Solvay Specialty Polymers, trade name: AVA SPIRE AV-650, relative permittivity 3.1, melting point 340° C. The rectangular wire 1 (see FIG. 1) was obtained in the same manner as Example 1, except that the resin was changed as above. At this time, the condition of the extrusion temperature in extrusion molding of the layer 21 of the thermoplastic resin was set as shown in Table 1.

Example 8

In the layer 21 (see FIG. 1) of the thermoplastic resin, the same modified polyetheretherketone as in Example 7 was used in place of the polyetheretherketone. The thickness of the layer 11 (see FIG. 1) of the thermosetting resin was set as shown in Table 2. The rectangular wire 1 (see FIG. 1) was obtained in the same manner as Example 2, except for those as above. At this time, the condition of the extrusion temperature in extrusion molding of the layer 21 of the thermoplastic resin was set as shown in Table 1, in the same manner as in Example 1.

Examples 9, 10, 11

The rectangular wires 1 (see FIG. 1) were obtained in the same manner as Example 1, except that the kind of the polyurethane varnish in the layer 11 (see FIG. 1) of the thermosetting resin was changed and that the thickness of the polyetheretherketone layer of the layer 21 (see FIG. 1) of the thermoplastic resin was changed. The condition of the extrusion temperature was set as shown in Table 1. As the polyurethane varnish, use was made of trade name: TSF242, manufactured by Totoku Toryo Co., Ltd., glass-transition point (Tg) of 195° C.

Examples 13, 14

Use was made of the same rectangular metallic conductor as in Example 1. Further, the thickness of the layer of the thermosetting resin was set as shown in Table 2, and the metallic conductor coated with the layer of the thermosetting resin was stacked in two layers. The two-layered metallic conductors were arranged by a two-line configuration, thus for preparing a multilayer conductor member. Further, the thickness of the layer of the thermoplastic resin was set as shown in Table 2. The rectangular wire 1 was obtained in the same manner as Example 1, except for those as above.

Example 15

Only on one side 2S in the width direction of the metallic conductor 2, the layer 11 (see FIG. 2) of the thermosetting resin was coated and baked. Except for the above, a rectangular wire 1 was obtained in the same manner as Example 3.

Example 16

Only on one side 2S in the width direction of the metallic conductor 2, the layer 11 (see FIG. 2) of the thermosetting resin was coated and baked. Except for the above, a rectangular wire 1 was obtained in the same manner as Example 4.

Comparative Examples 1 to 9

In Comparative Examples 1 and 2, a polyurethane enameled wire or an H-class polyester (HPE) was used in the layer 11 (see FIG. 1) of the thermosetting resin, respectively. Further, as the layer 21 (see FIG. 1) of the thermoplastic resin, use was made of a polyphenylenesulfide (PPS, manufactured by DIC Corporation, trade name: FZ-2100, relative permittivity 3.4, melting point 280° C.). The thickness of each of the layer 11 of the thermosetting resin and the layer 21 of the thermoplastic resin was set to thicknesses shown in Table 2. The rectangular wire 1 was obtained in the same manner as Example 1, except for those.

In Comparative Examples 3 and 4, the H-class polyester was used in the layer 11 (see FIG. 1) of the thermosetting resin. The thickness of each of the layer 11 of the thermosetting resin and the layer 21 (see FIG. 1) of the thermoplastic resin was set to thicknesses shown in Table 2. The rectangular wire 1 was obtained in the same manner as Example 1, except for those.

In Comparative Example 5, the number of layers to be sacked was made to 7. The thickness of each of the layer 11 (see FIG. 1) of the thermosetting resin was set to thickness shown in Table 2. The rectangular wire 1 was obtained in the same manner as Example 1, except for those.

In Comparative Example 6, the thickness of the layer 11 (see FIG. 1) of the thermosetting resin was set to 58 μm and the thickness of the layer 21 (see FIG. 1) of the thermoplastic resin was set to thickness shown in Table 2. The rectangular wire 1 was obtained in the same manner as Example 1, except for those. At this one baking step, the layer 11 of the thermosetting resin with thickness 5 μm or 6 μm was formed; and by repeating this step 11 times, the later with the thickness of 58 μm was formed.

In Comparative Examples 7 and 8, the polyurethane enameled wire or the H-class polyester (HPE) was formed, respectively, without forming the layer 11 of the thermosetting resin; and the thickness of this layer was set to thickness shown in Table 2. The rectangular wire 1 was obtained in the same manner as Example 1, except for those.

In Comparative Example 9, the layer of the thermoplastic resin was formed only, without providing any layer of the thermosetting resin. The rectangular wire 1 was obtained in the same manner as Example 1, except for those.

TABLE 1

| The theromoplastic resin to coat the multilayer conductor member by extrusion-molding | | PEEK | modified-PEEK |
|---|---|---|---|
| Temperature conditions for extruding | C1 (° C.) | 300 | 300 |
| | C2 (° C.) | 380 | 380 |
| | C3 (° C.) | 380 | 380 |
| | H (° C.) | 390 | 390 |
| | D (° C.) | 400 | 400 |

The following evaluations of the rectangular wires of Examples 1 to 14 and Comparative Examples 1 to 9 produced in these ways were conducted. The results of these evaluations are shown in Table 2.

(Welding Property)

Figure 3A:
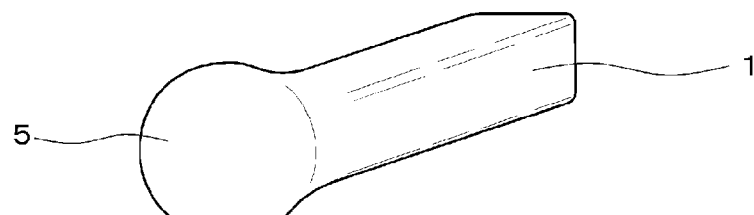
FIGS. 3(a), 3(b), 3(c), and 3(d) each are a figure showing evaluation of the welding property. In the figures.
Figure 3B:
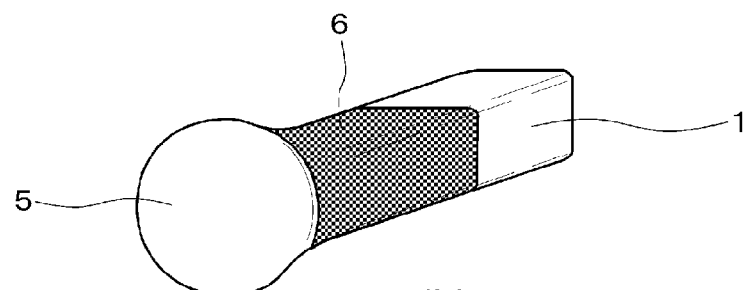
Figure 3C:
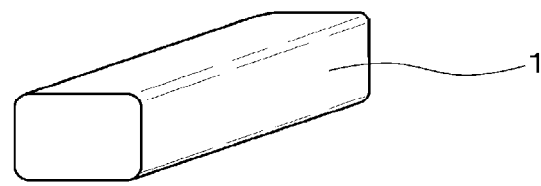
Figure 3D:
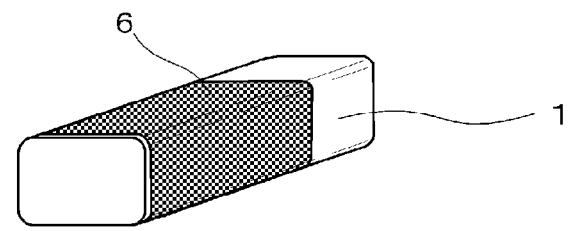

The wire terminal was welded under the conditions of: welding current 30 A; and welding time 0.1 seconds, by generating arc discharge. When a welding ball arose at the wire terminal, the welding was judged as operable. On the other hand, when the welding ball did not arise but flowed, the welding was judged as inoperable. Further, when black soot generated on the periphery of the welded area, the welding was also judged as inoperable. That is:

As shown in FIG. 3(a), when there was no change in color on the periphery of the welded area of the rectangular wire 1 and also a welding ball 5 arose at the terminal of the rectangular wire 1, the welding was judged as being excellent and was rated as "A";

As shown in FIG. 3(b), although soot 6 generated on the periphery of the welded area of the rectangular wire 1, when a welding ball 5 arose at the terminal of the rectangular wire 1, the welding was judged as being good and was rated as "B";

As shown in FIG. 3(c), when there was no change in color on the periphery of the welded area of the rectangular wire 1, but no welding ball 5 did arise at the terminal of the rectangular wire 1, the welding was judged as being poor and was rated as "C"; and As shown in FIG. 3(d), when soot 6 generated on the periphery of the welded area of the rectangular wire 1 and no welding ball 5 did arise at the terminal of the rectangular wire 1, the welding was judged as being inoperable and was rated as "D".

The acceptance criterion is "A" and "B" judgments.

(Anti-Heat Aging Property)

A linear wire was prepared and was subjected to a heat treatment at a constant temperature of 300° C. By the time taken for crack generation at a wire surface, to pass or fail of the ware was judged. That is:

(1) In the heat treatment at the constant temperature of 300° C., when the crack was unidentifiable at the surface of the wire after heating for 600 hours, the anti-heat aging property was judged as being excellent and was rated as "A".

(2) In the heat treatment at the constant temperature of 300° C., the crack was generated at the surface of the wire after heating for 600 hours, but the crack was unidentifiable at the surface of the wire after heating for 400 hours, the anti-heat aging property was judged as being good and was rated as "B".

(3) In the heat treatment at the constant temperature of 300° C., the crack was generated at the surface of the wire after heating for 400 hours, but the crack was unidentifiable at the surface of the wire after heating for 100 hours, the anti-heat aging property was judged as being poor and was rated as "C".

(4) In the heat treatment at the constant temperature of 300° C., when the crack was generated at the surface of the wire after heating for 100 hours, the anti-heat aging property was judged as being improper and was rated as "D".

The acceptance criterion is "A" and "B" judgments.

In evaluation of the anti-heat aging property at 300° C., whether the polyetheretherketone is present or absent can be found by the 400 hour-heat treatment. In the polyetheretherketone-covered wire, a crack is not generated, but, the crack is generated in an enamel-covered wire. For example, in the case of 800 hours or longer, a crack is generated in any of wires, and in the case of 100 hours, the resins other than the polyphenylenesulfide do not make any difference. Thus, as one condition for the evaluation, with regard to the heat treatment time, 400 hours and 600 hours were adopted. In this regard, with respect to a polyphenylenesulfide-covered wire, the polyphenylenesulfide is melted in the evaluation at 300° C. As a result, the evaluation of anti-heat aging property cannot be conducted regardless of the heat treatment time.

(High-Frequency Property)

Under the conditions of 1,000 Hz, 2.16 A and 138 Vrms, an AC magnetic field generator was put into operation, thereby generating AC magnetic field of 50 mT. When a sample is set in the magnetic field, heat generation due to eddy current is caused. The amount of heat generation at this time was measured and was defines as a current loss (W). A current loss $W_0$ of the rectangular wire in which a polyetheretherketone resin was extrusion-coated on a non-multilayered conductor was calculated as described above.

When the ratio of current losses W and $W_0$ of each sample was 0.8 or less (inhibition ratio of the current loss is 20% or more), high-frequency property was judged as being good and rated as "B". Further, when the ratio is 0.4 or less (inhibition ratio of the current loss is 60% or more), high-frequency property was judged as being excellent and rated as "A". On the other hand, when the ratio is more than 0.8 (inhibition ratio of the current loss is less than 20%), high-frequency property was judged as being poor and rated as "D".

$P=EI \cos \phi$ In this regard, $\phi=\tan^{-1}(Ls \cdot 2\pi f/Rs)$

E (V): Measured value of input voltage
Ls (H): Measured value of inductance
I (A): Measured value of input current
Rs (Ω): Measured value of resistance (Molding Property)

With regard to the rectangular wire formed by extrusion-coating a thermoplastic resin on the multilayer conductor member, the cross-section thereof was cut and observed. At this time, the cross-section was checked for a tilt and a misalignment of the multilayer. With regard to the tilt, whether the angle to the direction of the multilayer to be stacked is nothing was checked. Further, with regard to the misalignment, in the case of the multilayer to be stacked in the thickness direction, whether a misalignment of ⅓ or more of the length of width is nothing was checked, with respect to not only conductors adjacent to each other but also conductors in which a misalignment between them is largest. When such a tilt and misalignment were less than ⅓ of the length of width, the molding property was judged as being in an acceptable range and was rated as "A", "B", and "C".

Figures 4A, 4B:
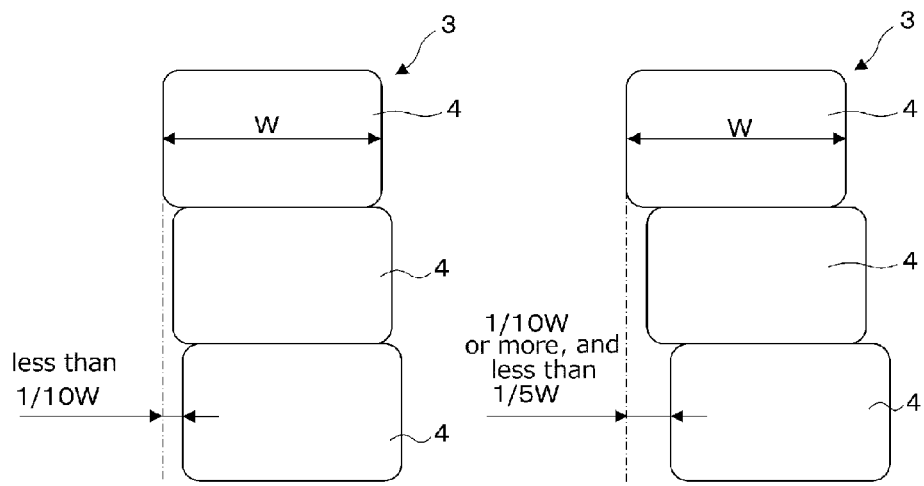
FIGS. 4(a), 4(b), 4(c), and 4(d) each are a figure showing evaluation of the molding property. In the figures.
Figures 4C, 4D:
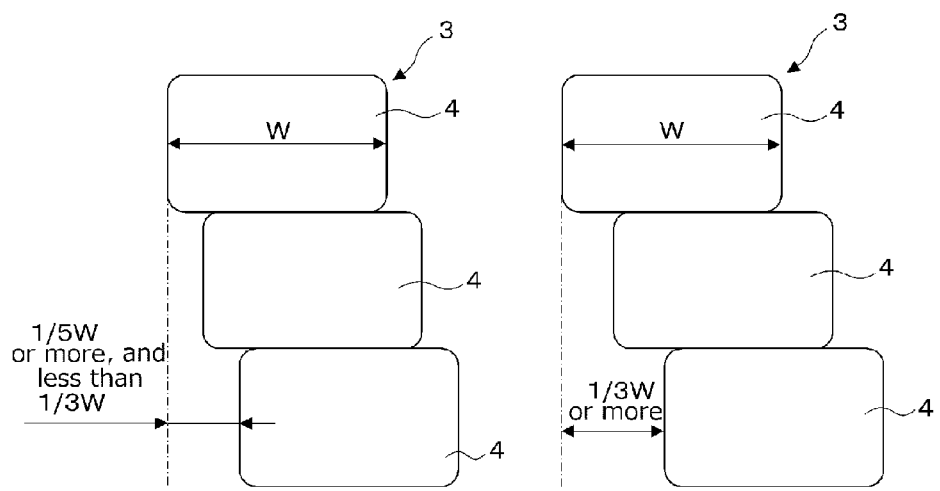

On the other hand, when such a tilt and misalignment existed, the molding property was judged as being poor and was rated as "D". That is:

As shown in FIG. 4(a), when the rectangular basic wire 4 constituting the multilayer conductor member 3 was stacked in the thickness direction, and the misalignment in the width direction of the rectangular basic wire 4 having the largest misalignment was the length of less than 1/10 of the width W, the molding property was judged as being excellent and was rated as "A";

As shown in FIG. 4(b), when the rectangular basic wire 4 constituting the multilayer conductor member 3 was stacked in the thickness direction, and the misalignment in the width direction of the rectangular basic wire 4 having the largest misalignment was the length of 1/10 or more and less than 1/5 of the width W, the molding property was judged as being good and was rated as "B";

As shown in FIG. 4(c), when the rectangular basic wire 4 constituting the multilayer conductor member 3 was stacked in the thickness direction, and the misalignment in the width direction of the rectangular basic wire 4 having the largest misalignment was the length of 1/5 or more and less than 1/3 of the width W, the molding property was judged as being in an acceptable range and was rated as "C"; and As shown in FIG. 4(d), when the rectangular basic wire 4 constituting the multilayer conductor member 3 was stacked in the thickness direction, and the misalignment in the width direction of the rectangular basic wire 4 having the largest misalignment was the length of 1/3 or more of the width W, the molding property was judged as being poor and was rated as "D".

The acceptance criterion is "A", "B" and "C" judgments.

TABLE 2

| | | Ex 1 | Ex 2 | Ex 3 | Ex 4 | Ex 5 | Ex 6 | Ex 7 | Ex 8 |
|---|---|---|---|---|---|---|---|---|---|
| Metallic conductor | Kind | Cu | Cu | Cu | Cu | Cu | Cu | Cu | Cu |
| | The number of stacked layers | 2 | 2 | 6 | 2 | 2 | 2 | 2 | 2 |
| The layer of therosetting resin | Kind | TPU | TPU | TPU | TPU | TPU | TPU | TPU | TPU |
| | Thickness of coating (μm) | 0.5 | 1.2 | 4 | 4 | 30 | 50 | 0.5 | 1 |
| The layer of theromoplastic resin | Kind | PEEK | PEEK | PEEK | PEEK | PEEK | PEEK | modified-PEEK | modified-PEEK |
| | Thickness of coating (μm) | 105 | 110 | 110 | 45 | 105 | 110 | 105 | 110 |
| Welding property | | A | A | A | A | B | B | A | A |
| Anti-heat aging property | | A | A | A | A | A | A | A | A |
| High-frequency property | | B | B | A | B | B | B | B | B |
| Molding property | | B | B | B | B | B | B | B | B |

| | | Ex 9 | Ex 10 | Ex 11 | Ex 12 | Ex 13 | Ex 14 | Ex 15 | Ex 16 |
|---|---|---|---|---|---|---|---|---|---|
| Metallic conductor | Kind | Cu | Cu | Cu | Cu | Cu | Cu | Cu | Cu |
| | The number of stacked layers | 2 | 2 | 2 | 6 | 2 + 2 | 2 + 2 | 6 | 2 |
| The layer of therosetting resin | Kind | TSF | TSF | TSF | TPU | TPU | TPU | TPU | TPU |
| | Thickness of coating (μm) | 2 | 0.5 | 0.5 | 3 | 3 | 3 | 4 (on one side) | 4 (on one side) |
| The layer of theromoplastic resin | Kind | PEEK | PEEK | PEEK | PEEK | PEEK | PEEK | PEEK | PEEK |
| | Thickness of coating (μm) | 42 | 147 | 188 | 150 | 45 | 161 | 110 | 45 |
| Welding property | | A | A | A | A | A | A | A | A |
| Anti-heat aging property | | A | A | A | A | A | A | A | A |
| High-frequency property | | B | B | B | A | B | B | A | B |
| Molding property | | B | B | B | C | B | B | B | B |

| | | CEx 1 | CEx 2 | CEx 3 | CEx 4 | CEx 5 | CEx 6 | CEx 7 | CEx 8 | CEx 9 |
|---|---|---|---|---|---|---|---|---|---|---|
| Metallic conductor | Kind | Cu | Cu | Cu | Cu | Cu | Cu | Cu | Cu | Cu |
| | The number of stacked layers | 2 | 2 | 2 | 6 | 7 | 2 | 2 | 2 | |
| The layer of therosetting resin | Kind | TPU | HPE | HPE | HPE | TPU | TPU | TPU | HPE | |
| | Thickness of coating (μm) | 1 | 2 | 1 | 2 | 1 | 58 | 25 | 30 | |
| The layer of theromoplastic resin | Kind | PPS | PPS | PEEK | PEEK | PEEK | PEEK | | | PEEK |
| | Thickness of coating (μm) | 103 | 105 | 112 | 105 | 105 | 110 | | | 110 |
| Welding property | | A | D | D | D | A | B | B | D | A |
| Anti-heat aging property | | D | D | A | A | A | A | C | B | B |
| High-frequency property | | B | B | B | A | A | B | B | B | D |
| Molding property | | B | B | B | B | D | D | B | B | B |

Note:
'Ex' means Example

Note:
'CEx' means Comparative Example

As shown in Table 2, it was found that in each of Examples 1 to 16, each of the welding property, the anti-heat aging property and the high-frequency property are excellent. In those Examples 1 to 16, the layer of the thermosetting resin on the outer periphery of the metallic conductor was composed of the thermosetting resin having a glass transition temperature of 100° C. or more and 200° C. or less and having a urethane bond, and the thickness thereof was 0.5 μm or more and 50 μm or less. Further, the layer of the thermoplastic resin on the outer periphery of the multilayer conductor member had a film constitution formed by a thermoplastic resin having a melting point of 300° C. or more, and the thickness thereof of 40 μm or more and 200 μm or less.

In contrast, from Comparative Examples 1 and 2, in the case where a layer of a thermoplastic resin on the outer periphery of the multilayer conductor member was extrusion-coated with a polyphenylenesulfide resin, an anti-heat aging property is hardly anticipated. Further, from Comparative Examples 2, 3, 4 and 8, in the case where a layer of a thermosetting resin on the outer periphery of the metallic conductor was composed of an H-class polyester, soot generated, which resulted in a poor welding property. Further, from Comparative Example 5, when the number of stacked layers was 7, the stacked layers were not well aligned in the thickness direction. Further, from Comparative Example 6, in the case where the thickness of the layer of the thermosetting resin on the outer periphery of the metallic conductor was 58 μm, it was also difficult to stack layers. From Comparative Example 7, in the case where only a polyurethane enamel wire layer was on the outer periphery of the metallic conductor, without any layer of a resin of a thermoplastic resin on the outer periphery of the multilayer conductor member, an anti-heat aging property was hardly anticipated. Further, from Comparative Example 9, it was found that a high-frequency property was hardly anticipated, in the rectangular wire extrusion-coated only with a polyetheretherketone resin on the outer periphery of a metallic conductor, without any layer of a thermosetting resin layer on the outer periphery of the metallic conductor.

Furthermore, it was also confirmed that each of the insulation wires of Examples 1 to 16 and Comparative Examples 1 to 9 satisfied the abrasion resistance and solvent resistance.

Having described our invention as related to the present embodiments together with the examples, it is our intention that the invention not be limited by any of the details of the description, unless otherwise specified, but rather be construed broadly within its spirit and scope as set out in the accompanying claims.

REFERENCE SIGNS LIST

1 Rectangular wire
2 Rectangular metallic conductor (Metallic conductor)
3 Multilayer conductor member
11 Layer of thermosetting resin
21 Layer of thermoplastic resin

The invention claimed is:

1. A rectangular wire having: a stacked multilayer conductor member comprising, in a thickness direction, a rectangular metallic conductor that has a layer of a thermosetting resin formed on the outer periphery thereof, the thermosetting resin having a glass transition temperature of 100° C. or more to 200° C. or less and the thermosetting resin is a thermosetting polyurethane-based resin; and a layer of a thermoplastic resin having a melting point of 300° C. or more to 450° C. or less only on the outer periphery of the multilayer conductor member, wherein the thickness of the thermoplastic resin layer is 40 μm to 200 μm, wherein the conductor has a width dimension perpendicular to a stacking direction and misalignment of the width dimension between one conductor to another adjacent conductor in the stacking direction is less than one-third of the width dimension.

2. The rectangular wire as claimed in claim 1, wherein the thermoplastic resin is a resin selected from the group consisting of a polyaryletherketone, a modified polyetheretherketone, and a thermoplastic polyimide.

3. The rectangular wire as claimed in claim 1, wherein the total number of stacking the rectangular metallic conductors in the thickness direction is 2 or more and 6 or less.

4. The rectangular wire as claimed in claim 1, wherein a thickness of a baked coat layer comprising the thermosetting resin is 0.5 μm or more and 50 μm or less.

5. A method of producing a rectangular wire comprising: a step of forming a multilayer conductor member by stacking, in a thickness direction, a rectangular metallic conductor having formed by bake-coating a layer of a thermosetting resin on the outer periphery thereof, the thermosetting resin having a glass transition temperature of 100° C. or more to 200° C. or less and the thermosetting resin is a thermosetting polyurethane-based resin; and a step of coating a layer of a thermoplastic resin having a melting point of 300° C. or more to 450° C. or less only on the outer periphery of the multilayer conductor member, wherein the conductor has a width dimension perpendicular to a stacking direction and misalignment of the width dimension between one conductor to another adjacent conductor in the stacking direction is less than one-third of the width dimension.

6. An electrical equipment comprising a rectangular wire having: a stacked multilayer conductor member comprising, in a thickness direction, a rectangular metallic conductor having a layer of a thermosetting resin formed on the outer periphery thereof, the thermosetting resin having a glass transition temperature of 100° C. or more to 200° C. or less and the thermosetting resin is a thermosetting polyurethane-based resin; and a layer of a thermoplastic resin having a melting point of 300° C. or more to 450° C. or less only on the outer periphery of the multilayer conductor member, wherein the conductor has a width dimension perpendicular to a stacking direction and misalignment of the width dimension between one conductor to another adjacent conductor in the stacking direction is less than one-third of the width dimension.

* * * * *